United States Patent [19]

Miyadera

[11] Patent Number: 5,014,080
[45] Date of Patent: May 7, 1991

[54] ACTIVE AF CAMERA HAVING REMOTE CONTROL APPARATUS

[75] Inventor: Shunichi Miyadera, Tokyo, Japan

[73] Assignee: Asahi Kogaku Kogyo Kabushiki Kaisha, Tokyo, Japan

[21] Appl. No.: 476,773

[22] Filed: Feb. 8, 1990

[30] Foreign Application Priority Data

Feb. 16, 1989 [JP] Japan .................................. 1-36998

[51] Int. Cl.$^5$ ............................................ G03B 13/36
[52] U.S. Cl. ..................................... 354/403; 354/266
[58] Field of Search ............... 354/402, 403, 401, 266, 354/412; 352/140

[56] References Cited

U.S. PATENT DOCUMENTS

| | | | |
|---|---|---|---|
| 4,470,686 | 9/1984 | Miyata . | |
| 4,534,629 | 8/1985 | Bogle et al. | 352/140 |
| 4,601,557 | 7/1986 | Bogle et al. | 352/140 |
| 4,816,855 | 3/1989 | Kitaura et al. | 354/266 |
| 4,864,340 | 9/1989 | Kaneko | 354/266 |
| 4,884,094 | 11/1989 | Kitaura et al. | 354/412 |
| 4,937,604 | 6/1990 | Yoshida et al. | 354/266 |

FOREIGN PATENT DOCUMENTS 63-237674 10/1988 Japan .
2077448 12/1981 United Kingdom .

OTHER PUBLICATIONS

Copy of the United Kingdom Search Report.

Primary Examiner—Russell E. Adams
Attorney, Agent, or Firm—Sandler, Greenblum & Bernstein

[57] ABSTRACT

An active AF camera comprises an active object distance measuring device including a first infrared emitter which emits first infrared radiation for measuring an object distance of an object to be photographed and a first infrared receiver which receives the infrared radiation reflected from the object. A remote control receiver is also provided which receives second infrared radiation emitted from a second infrared emitter of a remote control apparatus for remotely controlling the camera. The first infrared receiver and the remote control infrared receiver are made as a common infrared receiver.

13 Claims, 2 Drawing Sheets

ACTIVE AF CAMERA HAVING REMOTE CONTROL APPARATUS

BACKGROUND OF THE INVENTION

1. Field of the Invention

The present invention relates to an active auto-focusing camera (AF camera) having a remote control apparatus.

2. Description of Related Art

In a conventional infrared remote control camera in which the operations of the camera, such as a shutter release operation etc. can be remotely controlled, an infrared transmitter separate from the camera body emits infrared radiation (electrical pulse signal) which is received by an infrared receiver provided on the camera body.

The infrared radiation received by the infrared receiver is converted to electrical pulse signals which are transmitted to a remote controller. In the remote controller, the pulse signals are converted to object distance measurement start signals and release start signals etc. which are supplied to a control unit of the camera body.

In the control unit of the camera body, the detection of a distance of an object to be photographed, the detection of brightness of the object, the release etc. are performed in accordance with the output signals of the remote controller.

A conventional compact camera usually has an active type of infrared type of auto-focusing device (active infrared AF device) incorporated therein, which camera will be referred to as an active AF camera hereinafter. The infrared active AF device includes a infrared emitter which emits infrared radiation for measuring an object distance of an object to be taken (i.e., photographed, and an infrared) receiver which receives the infrared radiation (object distance signal) reflected from the object. Namely, the active AF camera has an infrared transmitter and an infrared receiver, in addition to a photographing lens and a finder, on the front face of the camera body. In addition, an incorporated strobe device must be also arranged on the front face of the camera body.

To incorporate the infrared remote control apparatus (infrared receiver) in an active AF camera, the frared receiver must be located on the front face of the camera body. However, as mentioned before, the photographing lens, the finder, the incorporated strobe device, the infrared emitter and receiver for measuring the object distance are already on the front face of the camera body. Accordingly, there is in sufficient space to provide the infrared receiver for the remote control apparatus on the front face of the camera body. Namely, it is very difficult or next to impossible to place the infrared receiver for the remote control apparatus on the front face of the camera body without increasing the size of the camera body.

SUMMARY OF THE INVENTION

The primary object of the present invention is to provide an active AF camera in which a remote control apparatus using a signal transmitting wave medium is incorporated therein without increasing the size of a camera body or deforming the existing camera body.

The inventor's attention has been directed to the fact that the signal for the measurement of the object distance and for the remote control are the same type of signal transmitting wave medium, for example infrared radiation or ultrasonic wave.

To achieve the object mentioned above, an active AF is provided with an active object distance measuring device including a first infrared emitter which emits first infrared radiation for measuring an object distance of an object to be photographed and a first infrared receiver which receives the infrared radiation reflected from the object. A remote control infrared receiver is provided which receives second infrared radiation emitted from a second infrared emitter of a remote control apparatus for remotely controlling the camera. The first infrared receiver and the remote control infrared receiver make use of a single common infrared receiver.

With this arrangement, since the infrared receiver for measuring the object distance and the infrared receiver for the remote control are incorporated in a common single infrared receiver. Thus, there is no increase in the number of components of the camera, resulting in an incorporation of a remote control apparatus (infrared receiver thereof) into a compact camera without increasing the size thereof.

BRIEF DESCRIPTION OF THE DRAWINGS

The invention will be described below in detail with reference to the accompanying drawings, in which.

DESCRIPTION OF PREFERRED EMBODIMENTS

Figure 1:
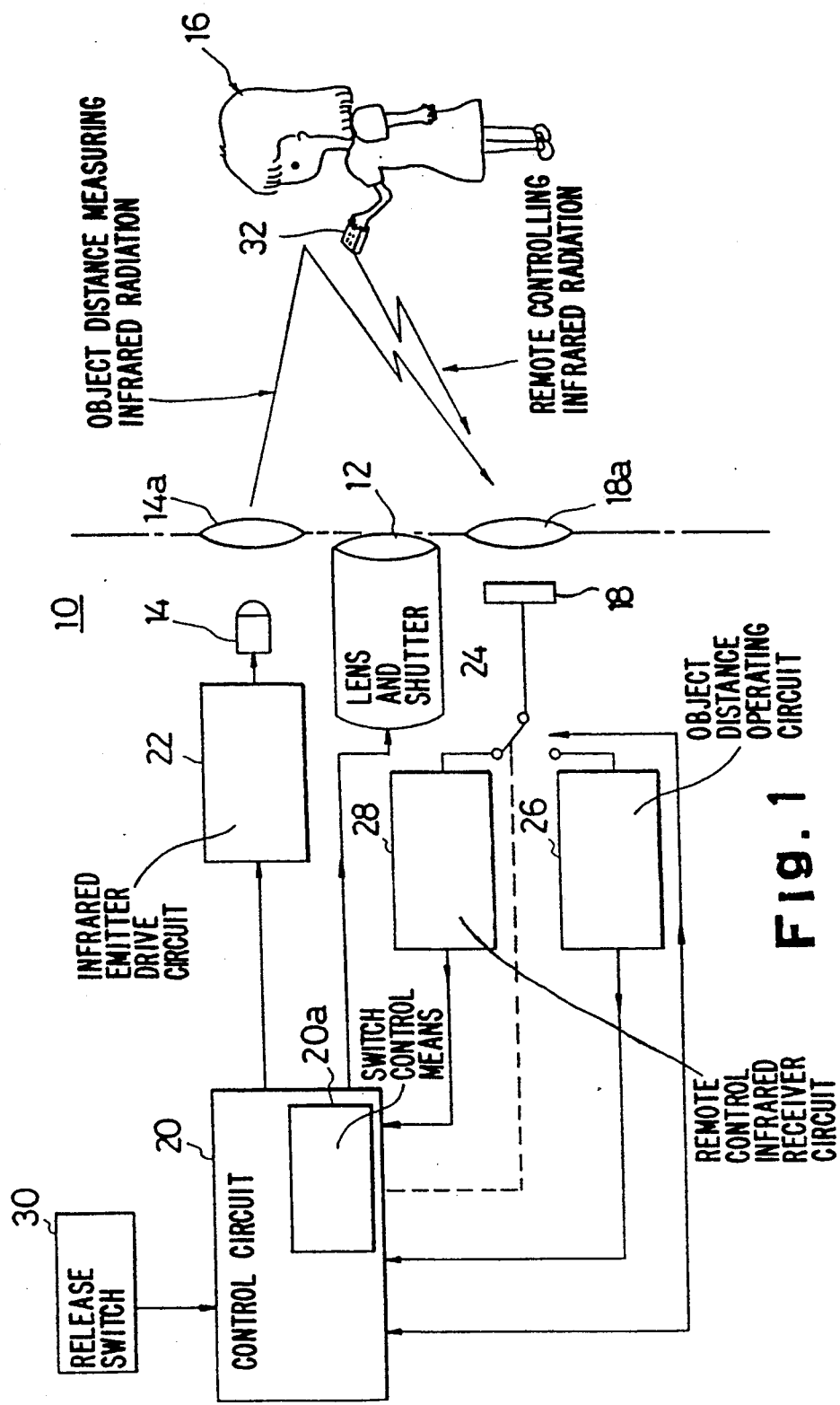
FIG. 1 is a block diagram of main components of an active AF camera having a remote control apparatus according to the present invention; and, FIG. 2 is a time chart of an active AF camera having a remote control apparatus, shown in FIG. 1.

In this embodiment, infrared (radiation) rays are used as a signal transmitting wave medium On a front face of a camera body 10 there are provided a photographing lens 12, an infrared emitter 14 which emits infrared radiation (first infrared radiation) for measuring an object distance of an object 16 to be photographed, and an infrared receiver 18 which receives the infrared radiation reflected from the object. The infrared emitter 14 and the infrared receiver 18 are located on the opposite sides of the photographing lens 12. The first infrared radiation emitted from the infrared emitter 14 is collimated by a collimator lens 14a to be a parallel beam and is incident upon the object 16. The infrared radiation reflected by the object 16 is condensed by a condenser lens 18a to be converged on the infrared receiver 18.

The photographing lens 12, as is well known, comprises a photographing optical system (not shown) having a focusing lens, a pulse motor (not shown) for driving the focusing lens, and a diaphragm and shutter unit (not shown). These elements are all driven by a control circuit 20 in the camera body. Namely, the focusing lens is moved to a focal position in accordance with the object distance signal detected by an object distance measuring device (not shown), and during the shutter releasing operation, the diaphragm is driven to a desired diaphragm value in accordance with the brightness signal (illuminance signal) detected by a brightness detecting device (not shown) and the shutter is opened and closed at a predetermined speed.

The object distance measuring infrared emitter 14 is driven by an infrared emitter driving circuit 22 which is in turn driven by a control circuit 20.

The output terminal of the infrared receiver 18 is selectively connected to an object distance operating circuit 26 as an object distance operating means or an remote control receiver circuit 28 as a remote control means by a selecting switch 24.

The selecting switch 24 which normally connects the infrared receiver 18 to the remote control receiver circuit 28 is controlled by the control circuit 20, so that when an infrared emitter driving circuit 22 is to be driven, the selecting switch 24 is switched to connect the infrared receiver 18 to the object distance operating circuit 26.

The control circuit 20 is composed of a microcomputer having a control means for controlling the object distance measuring operation and the switching operation of the selecting switch.

To the control circuit 20 is connected a release switch 30 which has two functions of an object distance measuring operation and a release operation, as is well known. Namely, when the release switch 30 is pushed down by a half step, the object distance measurement and the brightness detection are commenced, and when the release switch 30 is pushed down by a full step, the shutter is driven to perform the release operation. Namely, when the release switch 30 is pushed down by a half step, the control circuit 20 is connected to the object distance operating circuit 26 through the selecting switch 24 to drive the frared emitter driving circuit 22, so that object distance measuring infrared radiation is emitted from the infrared emitter 14. The infrared radiation emitted from the infrared emitter 14 is reflected by the object 16 and is then received by the infrared receiver 18 in which the infrared radiation is converted to an electrical object distance signal which is fed to the object distance operating circuit 26 through the selecting switch 24.

The object distance operating circuit 26 performs the arithmetic operation for detecting the object distance, so that the object distance thus obtained is supplied to the control circuit 20. The control 20 circuit 20 drives the focusing lens of the photographing lens 12 to come to a desired focal position in accordance with the object distance. Upon completion of the focusing, the control circuit 20 switches the selecting switch 24 to connect the infrared receiver 18 to the remote control infrared receiver circuit 28.

A remote control infrared receiver 32 separate from the camera body 10 comprises a circuit arrangement per se known, having an infrared emitter (second infrared emitter) which emits infrared radiation having a wavelength band substantially identical to that of infrared radiation emitted by the object distance measuring infrared emitter (first infrared emitter) 14, an operation switch for controlling the object distance measurement and the release operation, and a remote control infrared emitter circuit which converts the ON signal of the operation switch into a predetermined pulse signal which is outputted from the second infrared emitter as a remote controlling infrared radiation.

Figure 2:
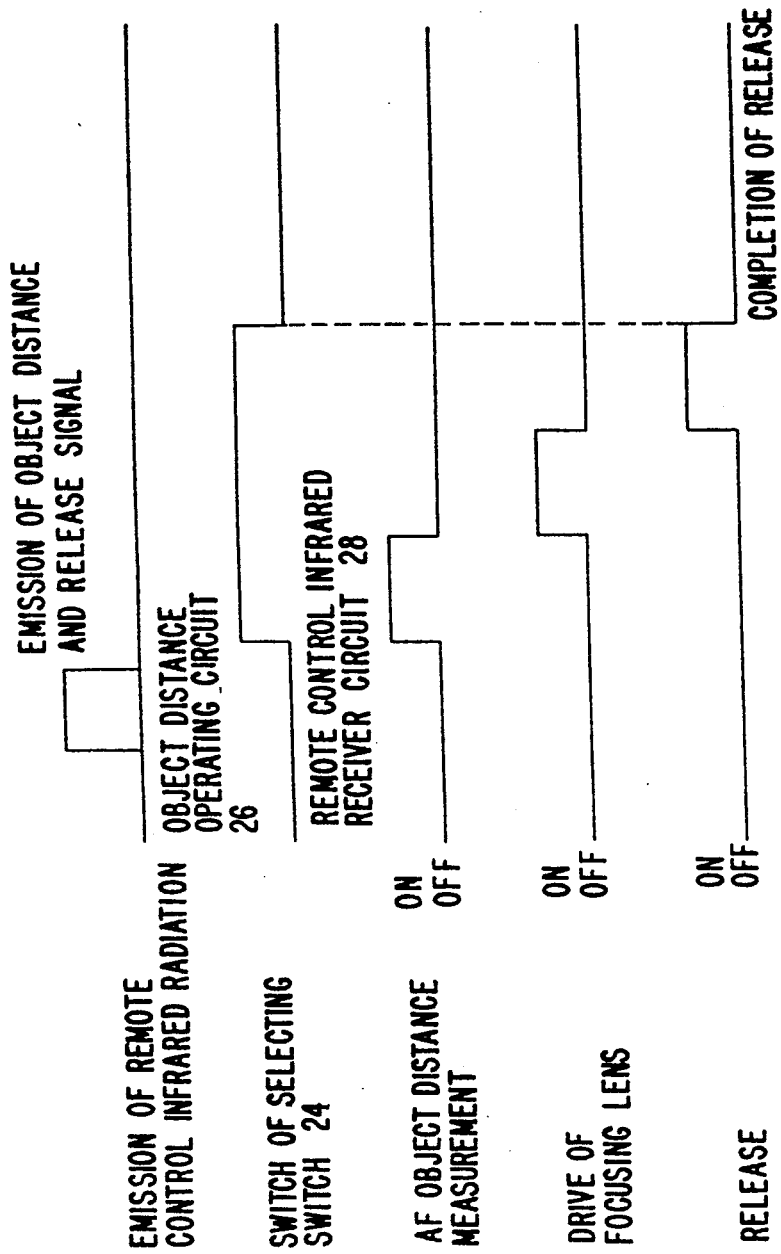

The remote control of the camera by the remote control infrared emitter 32 is as follows (see FIG. 2). Note that the subject of the present invention is not directed to the brightness detection, and accordingly no description therefore is given herein.

When the operation switch of the remote control infrared emitter 32 is pushed down by a half step or a full step, similarly to the actuation of the release switch 30, remote controlling infrared radiation which carries the object distance measurement start signal and the release start signal is emitted from the remote control infrared emitter 32. The infrared receiver 18 recives the remote controlling infrared radiation, so that the latter is converted to an electrical pulse signal which is then sent to the remote control infrared receiver circuit 28 through the selecting switch 24.

The remote control infrared receiver circuit 28 converts the pulse signal to the object distance measurement start signal and the release start signal which are supplied to the control circuit 20. The control circuit 20 first performs the object distance measurement process in accordance with the object distance measurement start signal and the release start signal. Namely, the control circuit 20 controls the switch control means 20a thereof to connect the infrared receiver 18 to the object distance operating circuit 26 through the selecting switch 24, thereby to perform the object distance measurement and the focusing operation, such as the emission of the object distance measuring infrared radiation from the object distance measuring infrared emitter 14. When the object distance measurement and the focusing operation are completed, the release operation is performed. Thereafter, the selecting switch 24 is switched by the switch control means 20a to connect the infrared receiver 18 to the remote control infrared circuit 28.

If no release start signal is included in the signal emitted from the remote control infrared emitter 32, no release operation is performed in the above-mentioned processes.

According to the embodiment mentioned above, since the infrared receiver 18 for the object distance measuring device is commonly used also as an infrared receiver for the remote control apparatus of the camera, no additional infrared receiver used only for the remote control is necessary, thus resulting in an easy incorporation of the remote control apparatus in the camera.

In an alternative, it is possible to include discrimination signals in the object distance signal and the remote control signal to discriminate one from another. In this alternative, if the object distance operating circuit 26 and the remote control infrared receiver circuit 28 have functions for discriminating the object distance signal and the remote control signal, the selecting switch 24 can be dispensed with. In this case, the outputs of the infrared receiver 18 are always supplied to the object distance operating circuit 26 and remote control infrared circuit 28.

In the above-mentioned embodiment, the control circuit 20, the object distance operating circuit 26 and the remote control infrared receiver circuit 28 are three independent circuits, but these circuits can be realized by one chip of a microcomputer.

The switching function of the remote control apparatus can include control functions, such as photographing mode change, forced strobe activation etc., in addition to the release function.

As can be understood from the foregoing, according to the present invention, since the infrared receiver of the infrared remote control apparatus and the infrared receiver of the infrared active AF device are constituted by the same infrared receiver, no additional infrared receiver only for the remote control apparatus is necessary, thus resulting in an increased freedom of design, and an easy incorporation of the remote control apparatus in a compact camera without increasing the size of the camera.

I claim:

1. An active AF camera comprising an active object distance measuring device including a first emitter which emits a first signal transmitting wave medium for measuring an object distance of an object to be photographed and a first receiver which receives the signal transmitting wave medium reflected from the object, and remote control means including a second emitter and a remote control receiver which receives a second signal transmitting wave medium emitted from said second emitter of said remote control means for remotely controlling the camera, wherein said first receiver and the remote control receiver comprise a single common receiver.

2. An active AF camera according to claim 1, wherein said signal transmitting wave medium is infrared rays.

3. An active AF camera according to claim 1, further comprising an object distance calculating means for arithmetically calculating the object distance when said single common receiver receives the first signal transmitting wave medium, said remote control means performing a release operation of the camera when said single common receiver receives the second signal transmitting wave medium, and switching means for selectively connecting the output of said single common receiver to said remote control means or to said object distance calculating means.

4. An active AF camera according to claim 3, further comprising a switch control means for controlling said switching means to connect said single common receiver to said object distance calculating means when said first emitter emits the first signal transmitting wave medium and otherwise connect said single common receiver to said remote control means.

5. An active AF camera comprising an active object distance measuring device including a first emitter which emits first signal transmitting wave medium for measuring an object distance of an object to be photographed and a first receiver which receives the signal transmitting wave medium reflected from the object, a second emitter which emits second signal transmitting wave medium for remotely controlling the camera, and a second receiver which receives the second signal transmitting wave medium emitted from the second emitter, said first receiver and the second receiver comprising a single receiver.

6. An active AF camera according to claim 5, wherein said signal transmitting wave medium is infrared rays.

7. An active AF camera having a remote control apparatus and an active object measuring device, comprising a single receiver which receives object distance measuring signal transmitting wave medium emitted from the active object distance measuring device and remote controlling signal transmitting wave medium emitted from the remote control apparatus.

8. An active AF camera according to claim 7, wherein said signal transmitting wave medium is infrared rays.

9. An active AF camera according to claim 7, further comprising a control means for controlling said single receiver so that said single receiver receives first the remote controlling signal transmitting wave medium and then the object distance measuring signal transmitting wave medium in the course of a remote control photographing.

10. An active AF camera having a remote control function in which a first receiver receives remote controlling signal transmitting wave medium to send an object distance signal, and an object distance measuring function in which object distance measuring signal transmitting wave medium is emitted in accordance with the object distance signal, so that the object distance measuring signal transmitting wave medium which is reflected from an object to be photographed is received by a second receiver to detect an object distance of the object, said first receiver and said second receiver comprising a single common receiver.

11. An active AF camera according to claim 10, wherein said signal transmitting wave medium is infrared rays.

12. An active AF camera according to claim 10, wherein said single common receiver receives the remote controlling signal transmitting wave medium first and then the object distance measuring signal transmitting wave medium in the course of a remote control photographing.

13. An active AF camera according to claim 12, further including a control means for controlling the camera, wherein after the object distance is detected, said control means drives a focusing lens incorporated in the camera to a desired focal position corresponding to the object distance and then release a shutter of the camera.

* * * * *